United States Patent [19]

Roeder

[11] 3,809,945

[45] May 7, 1974

[54] SHADOW MASK FOR COLOR CATHODE RAY TUBE AND METHOD OF MANUFACTURE THEREOF

[75] Inventor: Neil M. Roeder, Villa Park, Ill.

[73] Assignee: Zenith Radio Corporation, Chicago, Ill.

[22] Filed: Mar. 2, 1973

[21] Appl. No.: 337,339

[52] U.S. Cl. ................. 313/85 S, 29/25.18, 72/701

[51] Int. Cl. ........................................... H01j 29/06

[58] Field of Search .................. 313/85 S; 29/25.18; 72/701

[56] References Cited

OTHER PUBLICATIONS

Strasser, Frederico, How to Prevent Distortion of Pierced Holes During Forming." The Iron Age, Vol. 178, No. 8, August 20, 1953, pages 134–135. Patent Office Library number TS 200 I8

*Primary Examiner*—Herman Karl Saalbach
*Assistant Examiner*—Richard A. Rosenberger
*Attorney, Agent, or Firm*—John J. Coult

[57] ABSTRACT

This disclosure depicts novel aperture masks for rectangular color cathode ray tubes which are constructed such that hole enlargement, distortion or tearing which may be introduced in a mask-forming operation is minimized. In each embodiment depicted, a mask blank from which a mask is formed has an interior portion containing a pattern of electron-transmissive apertures, a peripheral portion adapted to be permanently deformed into a rigid mask skirt, and a transition structure between the interior and peripheral portions. The transition structure is caused to have a yield strength which is between that of the interior portions and said peripheral portion such that at least a part of the stretching forces and stretch deformation introduced in the mask-forming operation which would otherwise act upon and distort the aperture pattern in the interior portion of the mask is absorbed by the transition structure. In a preferred embodiment, the transition structure is provided by the formation of a plurality of additional rows of mask apertures etched part-way-through on the periphery of the aperture pattern which cause the transition structure to have the said intermediate yield strength. Alternative transition structures and methods for fabricating masks as described are also depicted.

14 Claims, 13 Drawing Figures

SHADOW MASK FOR COLOR CATHODE RAY TUBE AND METHOD OF MANUFACTURE THEREOF

BACKGROUND OF THE INVENTION

This invention is directed to improving aperture masks of the type employed in "shadow mask"-type color cathode ray tubes for masking the flow of electrons to an associated color phosphor screen. Masks of the type with which this invention is concerned are described in general terms in U.S. Patents No. 3,351,996 - Fiore; 3,492,522 - Pappadis; 3,601,650 - Pappadis; and 3,358,170 - Fiore, all assigned to the assignee of the present invention.

Because of the stringent manufacturing tolerances on aperture mask hole size and hole location for high quality television reproduction, it is important that the aperture mask used to mask the electron beam be extremely rigid after assembly. Aperture masks of the type with which this invention is concerned are typically manufactured by first preparing a mask blank which has formed in a perforate interior portion thereof a pattern of electron-transmissive apertures which control the flow of electrons to the active part of the associated phosphor screen. An imperforate peripheral portion around the interior portion is provided in order to block electrons which are not intended for impingement upon the phosphor screen and to provide a region of high yield strength capable of being deformed into a skirt which rigidifies the mask.

After the blank has been prepared and stress-relieved, typically by a cold roller-tempering process, the skirt is shaped in a conventional forming operation. In the forming operation in which the skirt is made, the blank is stretched radially and permanently deformed outwardly out of the plane of the blank. The deeper the "draw" of the forming dies, i.e., the longer the skirt, the greater the moment of inertia and rigidity of the mask.

The described non-uniform stretching and deformation of the mask blank has a deleterious effect on the end-product mask. First, it results in a non-uniform enlargement of the mask holes, causing particularly exaggerated enlargement of the holes in the corners of the mask. Conventional present day shadow mask-type color picture tubes have masks in which the size of the mask apertures is graded, the holes in the mask being progressively smaller from the center toward the mask periphery. The described stretching of the mask caused by the mask-forming operation introduces what is commonly termed "reverse grading." Reverse grading is a reversal in the desired gradation of hole size from larger to smaller toward the mask periphery such that the mask holes cease becoming smaller and begin instead to get larger. This reversal in the grading of hole size introduces degradation in the quality of the pictures produced by the finished tube.

Secondly, the non-uniform stretching of the mask blank in the mask-forming operation also acts to distort the shape of the holes in the periphery of the aperture pattern and in some cases causes a tearing of the interstitial bridges between the mask holes.

The described stretching-induced effects are particularly severe in color picture tubes of the medium and smaller sizes, e.g., 14 inches, 16 inches, 17 inches and 19 inches diagonal, since in these tubes there is used a smaller corner radius on the forming dies than on dies for larger tubes, and because typically a smaller margin is permitted between the outer row of mask holes and the mask shoulder, e.g., 1/8 inch as compared with 3/8 inch for larger holes. The problems associated with mask over-stretching are also aggravated in masks used in negative guardband-type color tubes which have augmented hole size, since larger hole sizes for a given hole spacing result in smaller interstitial bridge regions between the holes and consequently in a structurally weaker mask.

Thus on the one hand it is desirable to have as deep a skirt as possible on an aperture mask in order to enhance its structural rigidity. On the other hand, deeper mask skirts imply greater non-uniform stretch deformations of the mask periphery, particularly in the corners.

It has been found that whereas the problem of hole enlargement, distortions and tearing is present in normal mask-forming operations, the problem is particularly acute when a mask is overstretched beyond a nominal stretch factor during the mask-forming operation. Overstretching of masks is not uncommon in routine mask-forming operations.

Further, as a result of the sharp discontinuity in yield strength of conventional masks at the boundaries of the hole pattern, creasing of a mask blank is apt to occur at these boundaries during the roller tempering operation, particularly as the mask blank is being rolled in directions perpendicular to the major and minor axes of the blank.

OBJECTS OF THE INVENTION

It is a general object of this invention to provide improved aperture masks for color cathode ray tubes and improved methods for making such masks.

It is a less general object to provide aperture masks for color picture tubes which are so structured that non-uniform enlargement, distortions, tearing and reverse size grading of peripheral mask holes introduced by the mask-forming operation are minimized.

It is another object to provide novel methods for making aperture masks for color picture tubes which minimize deformation, distortion and tearing of holes in the end-product mask.

It is yet another object to provide improved aperture masks for color picture tubes and improved methods of manufacturing therefor which reduce the described creasing in mask blanks introduced during roller tempering thereof.

It is still another object to provide improved aperture masks and mask making methods which do not contribute significantly to mask manufacturing costs.

It is another object to provide an improved aperture mask fabricating method which does not require any aditional processing steps other than those required for the conventional manufacture of masks.

DESCRIPTION OF THE PREFERRED EMBODIMENTS

Figure 1:
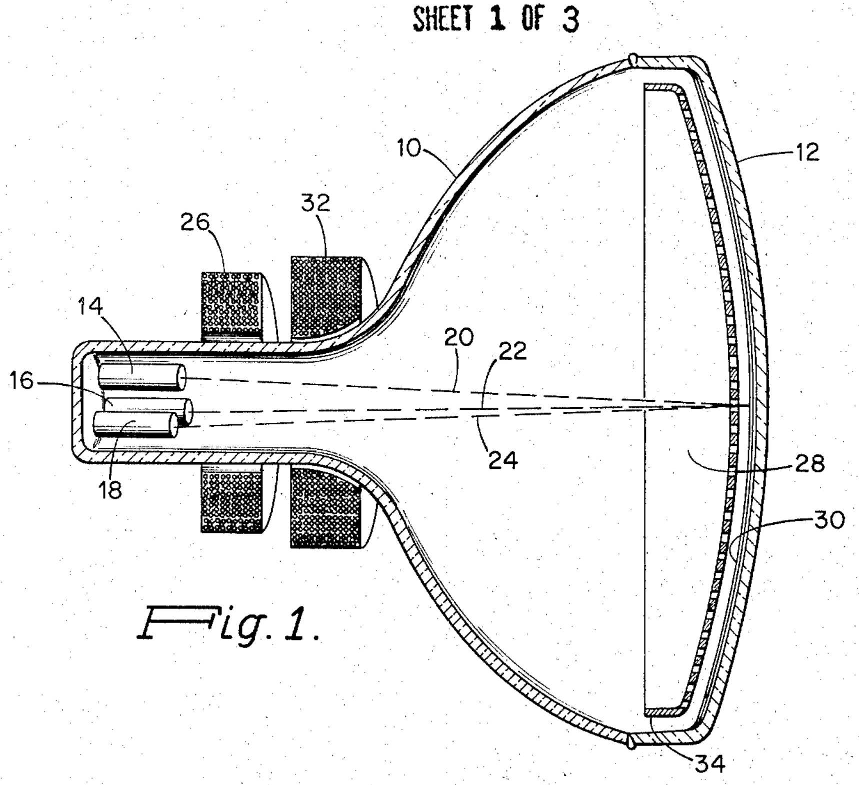
FIG. 1 illustrates a conventional prior art shadow mask-type color cathode ray tube.

FIGS. 1–4 illustrate a conventional prior art color cathode ray tube of the shadow mask type employing a phosphor screen comprising a mosaic of red, blue and green dot triads. This prior art tube structure will be described with the purpose of highlighting the mask deformation problems to which this invention is addressed. FIG. 1, in highly schematic form, illustrates a color cathode ray tube as comprising an envelope in the form of a glass funnel 10 which is sealed to a glass front panel 12. Electron guns 14, 16, 18 are shown schematically as being arranged in a triangular configuration and as generating three electron beams 20, 22, 24 on which are impressed red, blue and green color information signals. A focusing coil 26 serves to focus the beams such that they individually converge and mutually intersect at a shadow mask 28. The electron beams pass through apertures 29 in the mask 28 and impinge upon a phosphor screen 30.

As is well known, the shadow mask 28 and the angular separation of the electron beams 20, 22, 24 serve to isolate the red, blue and green information channels, causing the red information-carrying beam to impinge only on red phosphor areas on the phosphor screen 30, the blue information-carrying beam to impinge only on blue phosphor areas on the screen 30 and the green information-carrying beam to impinge only on the green phosphor areas on the screen 30. A deflection coil 32 serves to sweep the three electron beams 20, 22, 24 together across the phosphor screen 30.

Figure 2A:
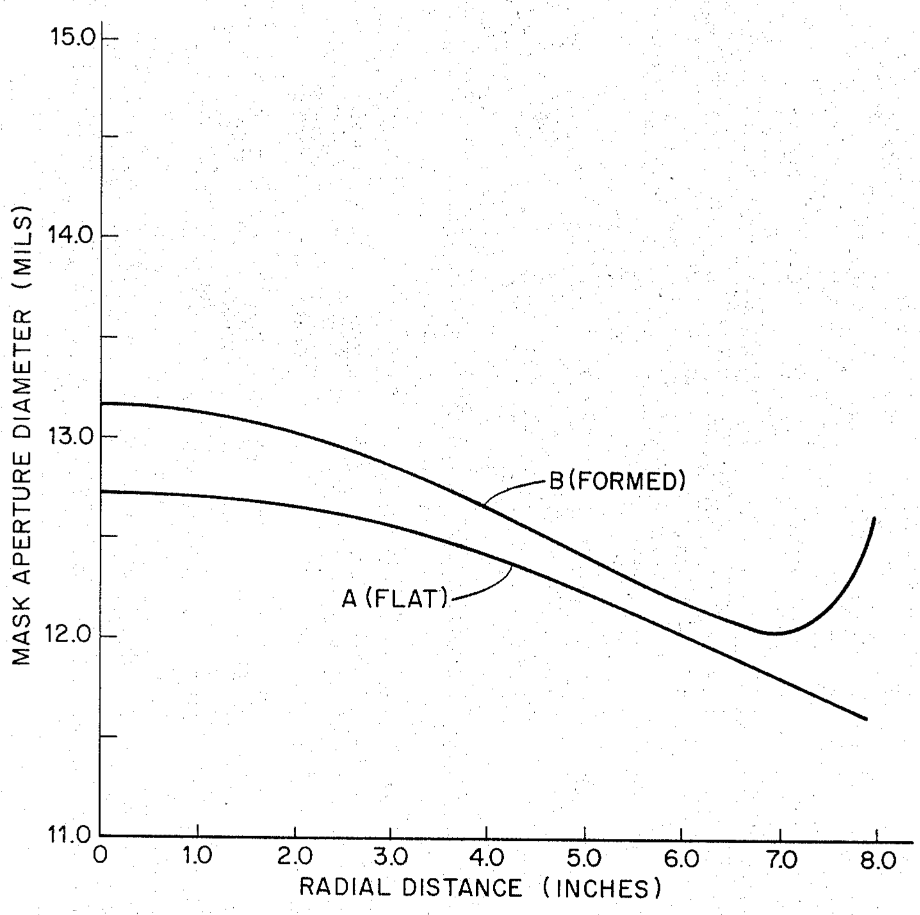
FIG. 2A depicts the mask aperture size grading characteristic of the FIGS. 1–2 mask, before and after being formed (curves A and B, respectively)
Figures 2, 2B, 2C:
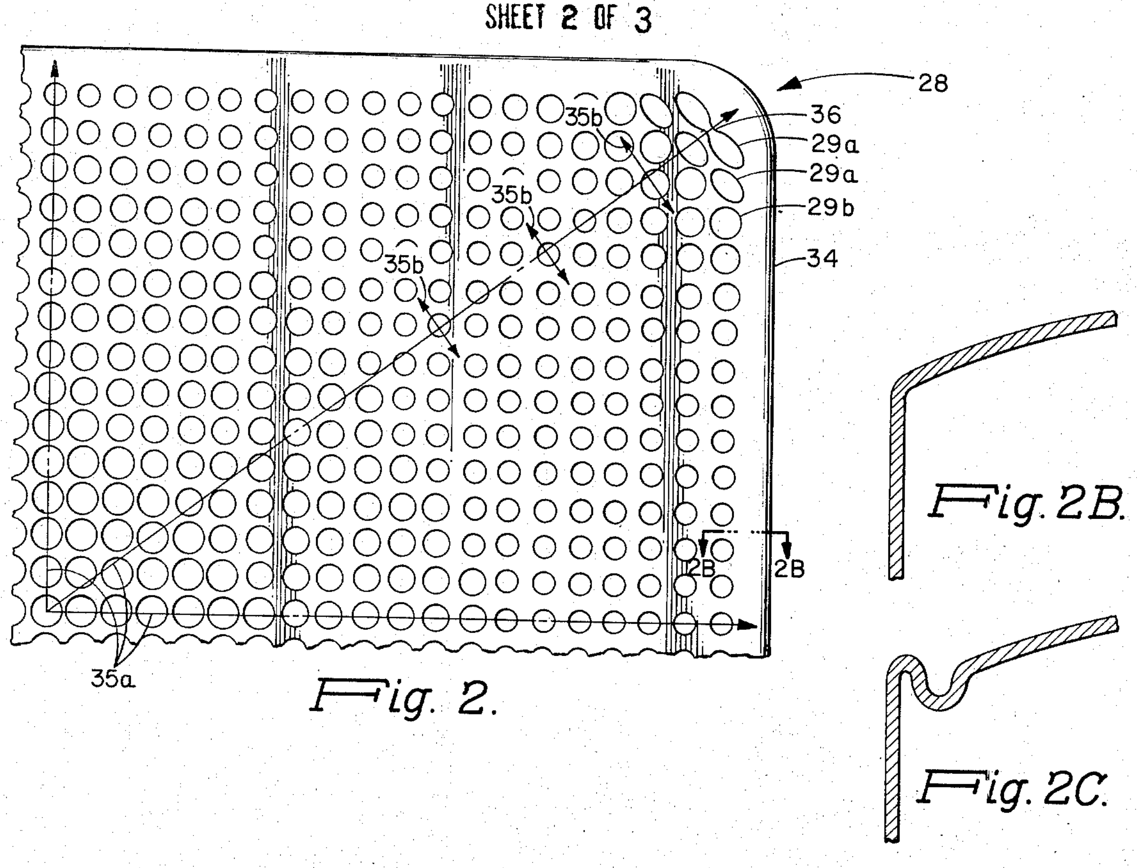
FIG. 2 is a schematic fragmentary plan view, partially exaggerated, of a portion of a shadow mask shown in FIG. 1.
FIG. 2B is a sectional view taken along lines 2B—2B in FIG. 2.
FIG. 2C is a sectional view corresponding to FIG. 2B of another type of mask to which this invention is applicable.

FIG. 2 is a plan view of a portion of mask 28 which shows in exaggerated representation the above-described outward gradation of hole size. FIG. 2A is a diagram depicting the size grading characteristic of the apertures in a typical mask, as shown in FIG. 2, used in 16 inch diagonal commercial shadow mask color tubes manufactured by the assignee of this invention. The above-mentioned reverse grading, particularly on all corner diagonals, of hole size introduced by the mask-forming operation can be seen at the tail of curve B. FIG. 2B is a sectional view of the skirt of the FIG. 2 mask. FIG. 2C is a sectional view of another type of commercial shadow mask to which the principles of this invention is equally applicable.

Figure 3:
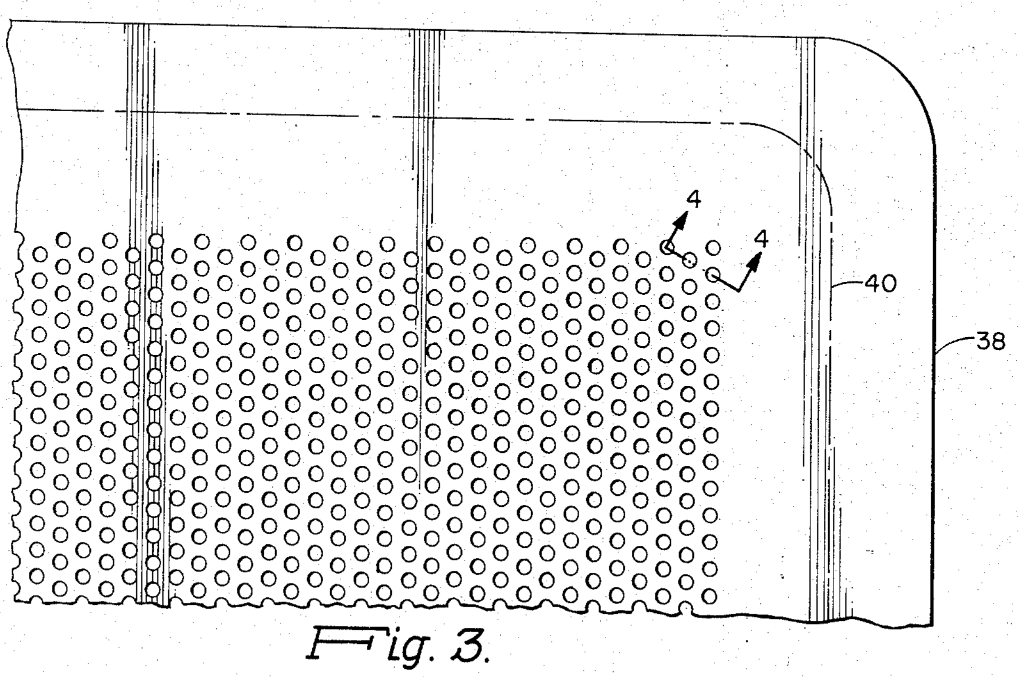
FIG. 3 depicts a mask blank, representing the FIG. 2 mask before being formed.
Figure 4:
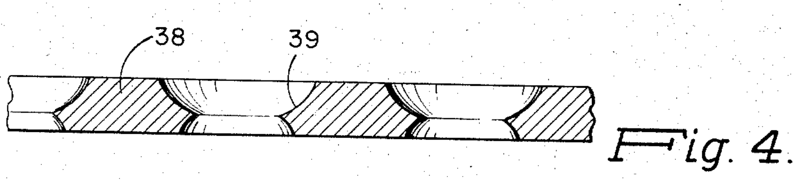
FIG. 4 is a sectional view taken along lines 4—4 in FIG. 3.

FIG. 3 represents in schematic form a plan view of a conventional mask blank 38 as it would appear prior to the mask-forming operation. In the mask-forming operation, the blank 38 is deformed generally along deformation line 40. FIG. 4 is a sectional view of the FIG. 3 mask blank which illustrates the cross-sectional configuration of holes 39 as they might appear when formed by conventional two-sided mask etching processes in common use today.

As described in some detail above, during the mask-forming operation, severe non-uniform stretching of the mask is apt to be introduced, particularly at the corners of the mask. In FIG. 2, radial stretching forces and associated transverse forces which are produced are denoted by lines 35*a* and 35*b*, respectively. The effect of these stretching forces is shown in FIG. 2, somewhat exaggerated, as the enlargement, distortion and tearing of certain of the peripheral holes in the mask 28. For example, holes 29*a* are shown as being enlarged and distorted; holes 29*b* are enlarged only; a tear of the interstitial bridge between two holes is also shown at 36.

In accordance with one apsect of this invention there is provided a novel mask blank 41 comprising a thin sheet composed of a permanently deformable material such as steel. The blank 41 has an interior portion, shown at 42 in FIG. 5, containing a predetermined pattern of electron-transmissive apertures or holes for selectively transmitting electrons to the active portion of an associated phosphor screen. Due to the perforated nature of the interior portion 42, this area of the mask blank 41 has a relatively low yield strength.

The mask blank 41 has a peripheral portion 44 surrounding the interior portion 42 adapted to be deformed into the configuration of a rigidifying skirt. The peripheral portion 44 of the blank, being unperforated, has a relatively high yield strength.

Underlying this invention, it has been recognized that at the boundary between the interior portion 42 and the peripheral portion 44 there is created a sharp discontinuity in the yield strength of the mask blank material. It has further been recognized that it is this discontinuity that causes the aforedescribed non-uniform hole enlargement, distortion and tearing and the creasing of the mask blank when subjected to a roller tempering operation.

In accordance with this invention, the blank 41 is provided with a transition structure 48 between the interior and peripheral portions 42, 44 having a yield strength intermediate that of interior portion 42 and the peripheral portion 44. The transition structure 48 at least partially circumscribes the interior portion 42 containing the aperture pattern and acts to absorb at least a part of the stretching forces and stretch deformation introduced in the mask-forming operation which would otherwise act upon and distort the aperture pattern in the interior portion 42 of the formed mask.

The transition structure provided in accordance with this invention acts as a buffer zone which breaks up the described yield strength discontinuity between the high yield strength peripheral portion 44 of the blank and the relatively low yield strength perforate interior portion 42. The transition structure provided by this invention acts not only to reduce the described hole enlargement, distortion and tearing effects, but also serves to reduce the tendency of a mask blank to crease when subjected to roller tempering operations.

As will be pointed out below, a number of structures are contemplated for implementing the above-described transition structure - a preferred structure 48 and its method of fabrication are shown in FIGS. 5–7D.

Before engaging a detailed discussion of the preferred mask blank embodiment and associated fabrication method, a brief description of a conventional mask blank preparation process useful in connection with implementation of this invention will be described. A method of fabricating mask blanks in common use today involves etching the mask holes from both sides. Two-sided etching offers a higher degree of control of hole size than is readily achievable with one-sided etching. In the two-sided etch process, a mask blank is prepared by depositing on opposite sides of a sheet of mask material, in an interior region thereof, registered, etch-resistant layers having stencil patterns corresponding in geometry to the aperture pattern desired. The mask blank is etched through the stencil patterns from both sides, producing an etched hole configuration having a waist, as shown clearly in FIG. 4. The stencil pattern on one side (the top side in FIG. 4) is typically caused to have larger hole openings than the stencil pattern on the opposed side in order that the finished holes will have a tapered configuration after etching. As is well known in the art, a tapered hole configuration is desirable to order to prevent effective hole closedown to the electron beam as it is scanned off axis.

Figure 5:
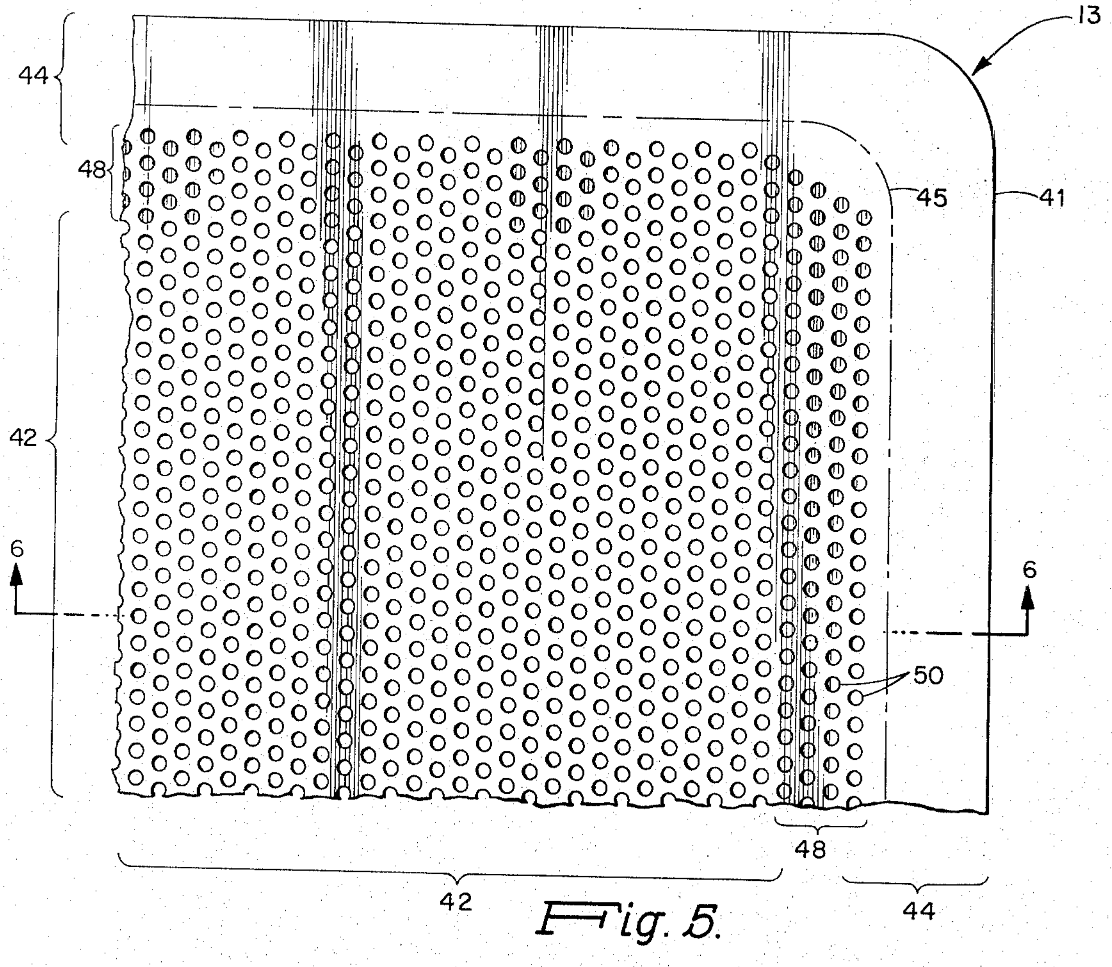
FIG. 5 schematically illustrates a portion of a mask blank fabricated according to the teachings of this invention.
Figure 6:
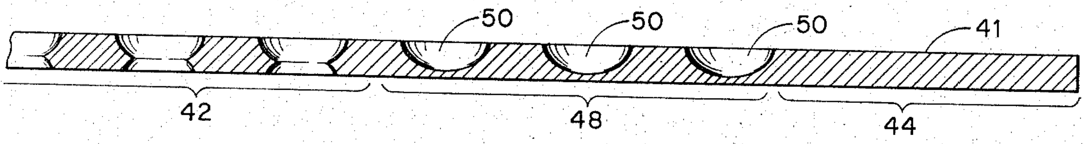
FIG. 6 is a schematic fragmentary sectional view taken along lines 6—6 of FIG. 5.

In accordance with a preferred implementation of this invention, the described transition structure takes the form of thinned down areas on the mask blank, for example, rows of partially etched holes, i.e., elemental areas in which the blank material is etched only part-way-through, as shown in FIGS. 5 and 6. Alternatively, thinned down or otherwise weakened areas or regions could be formed in a mask blank to implement this invention by stamping, milling or other suitable metal working operations or by suitably modifying the mask blank structure.

A preferred method of implementing the preferred form of the present invention, namely rows of partially etched holes, involves modifying the above-described conventional two-sided etching process as follows. The stencil pattern on one side of the blank is caused to have a transition structure stencil pattern formed in the etch-resistant layer which extends outwardly from the aperture stencil pattern into a portion of the peripheral portion 44 around the described interior portion 42 of the blank 41. The blank is subjected to the conventional two-sided etching process.

Upon etching of mask blank 41, in the area of transition structure 48 the blank 41 is etched from one side only and only part way through so as to create a number of rows of partially etched holes as shown clearly at 50 in FIG. 5. The partially etched holes 50 effectively represent a thinning down of the blank material with the result that the transition structure 48 is caused to have a yield strength which is intermediate that of the interior portion 42 (after hole formation) and the peripheral portion 46 of the blank.

In a preferred embodiment of the invention, the number of rows of partially etched holes constituting the transition structure 48 is caused to differ from point to point around the mask blank 41 in such a way that a wider transition structure is provided at the corners of the blank 41 than at the top and sides thereof. By way of example, the transition structure 48 may comprise 2–3 rows of partially etched holes at the top and sides of the mask blank 41 but 4-6 rows of partially etched holes in the corner regions. By this expedient, the greatest amount of absorption of stretch deformation is provided in the regions where it is most needed.

Figure 7A:
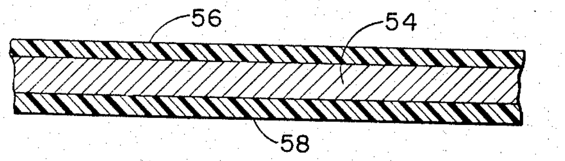
FIGS. 7A–7D depict schematically a flow diagram illustrating a novel method for manufacturing masks according to the invention.

FIGS. 7A–7D illustrate schematically a flow diagram of the preferred method for forming a mask blank having the structure shown in FIG. 5. Referring to FIG. 7A, in a first operation a trimmed mask blank 54 is coated on both sides with layers 56, 58 of photoresist material such as photosensitized polyvinylalcohol (PVA). In a subsequent operation or operations, the layers 56, 58 are dried and exposed to actinic radiation in registered optical patterns which are the negative of the desired mask aperture pattern, shown by darkened shading. See FIG. 7B.

Figure 7B:
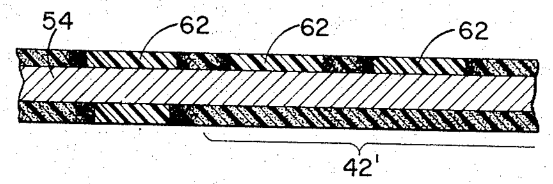

In accordance with a preferred method for fabricating masks as described, referring to FIGS. 7A–7D, the optical patterns impressed upon one of the layers is caused to have a transition structure stencil pattern extending outwardly from the aperture stencil pattern into a transition area of the mask blank. In FIG. 7B, the top layer 56 is shown as having the described transition structure stencil pattern in the form of a number of additional rows of mask aperture images 62. In FIG. 7B the layer 56 is shown as having larger hole openings than the layer 58; the mask aperture images forming part of the transition zone stencil pattern are also shown as being of the same general size as the aperture images in the remainder of the layer 56, however it is within the purview of this invention to make the transition structure stencil pattern in the form of aperture images of any predetermined size, spacing or configuration consonant with the above-stated objectives to be accomplished by the transition structure.

Figure 7C:
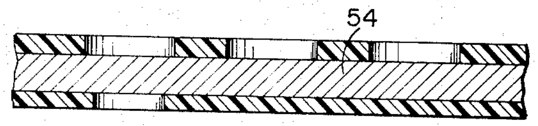
Figure 7D:
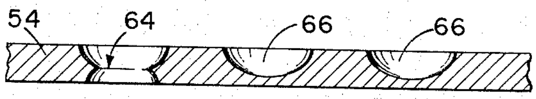

The photoresist layers 56, 58 are subsequently developed, are shown in FIG. 7C, producing stencil patterns suitable for selective etching of the mask blank 54. The blank is then etched from both sides in accordance with well-known etching methods to form through holes 64 in the interior region 42' of the blank and partially etched holes 66 constituting the transition structure.

To form a completed mask, the etched blank is subsequently annealed and roller tempered to relieve internal stresses and then subjected to a forming operation in which the mask skirt is shaped. The mask-forming operation is conventional.

In successful tests performed using the above-described preferred mask blank structure and method of fabrication, using a mask-forming die having a relatively sharp corner radius, it was found that at nominal stretching parameters the reverse grade of an improved mask having rows of partially etched holes varying in number from two to six around the periphery of the blank, as described above, was less than one-third that of standard prior art masks. Hole enlargement, distortion and tearing was markedly reduced. In the tests wherein the mask was over-stretched, simulating over-stretching which occurs in routine mask-forming operations (wherein the reverse grade problem has been found to be most severe), the improved mask showed marked superiority over conventional prior art masks.

Certain changes may be made in the above-described method and apparatus without departing from the true spirit and scope of the invention herein involved. For example, means other than as shown can be employed for providing a transition structure having the described intermediate yield strength. The invention is herein described as being applied to aperture masks of the type having a pattern of generally circular holes adapted for use in color tubes having a phosphor screen comprising a mosaic of red-blue-green dot triads. The principles of the invention, however, are susceptible of general application to masks of the type used to control the flow of electrons in color cathode ray tubes of various types - by way of example, the invention may be applied to slot-type or other types of shadow masks. It is intended therefore that the subject matter in the above depiction shall be interpreted as illustrative and not in a limiting sense.

I claim:

1. A mask blank to be formed into an aperture mask for masking electrons flowing to the screen of a color cathode ray tube, comprising a thin sheet of electrically conductive, permanently deformable material, said sheet having an interior portion of relatively low yield strength containing a predetermined pattern of electron-transmissive apertures, a peripheral portion which is adapted to be deformed in a mask-forming operation into a rigidifying skirt, and which has a relatively high yield strength, and a transition structure between said interior and peripheral portions of yield strength intermediate that of said interior portion and said peripheral portion, said transition structure at least partially circumscribing said interior portion to absorb at least a part of the stretching forces and stretch deformation introduced in the mask-forming operation which would otherwise act upon and distort said interior portion and thus said aperture pattern.

2. The blank defined by claim 1 wherein said sheet comprises a one-piece member having said transition structure formed integrally therein.

3. The blank defined by claim 2 wherein said sheet is thinned in said transition structure to cause said zone to have said intermediate yield strength.

4. The blank defined by claim 2 wherein said blank has material removed therefrom in predetermined areas in said transition structure to cause said transition structure to have said intermediate yield strength.

5. The blank defined by claim 4 wherein said transition structure represents a plurality of rows of apertures etched only part-way through.

6. An aperture mask for masking electrons flowing to the screen of a color cathode ray tube, comprising a thin sheet of electrically conductive, permanently deformable material, said sheet having an interior portion having relatively low yield strength and containing a predetermined pattern of electron-transmissive apertures, a peripheral portion having a relatively high yield strength formed in a mask-forming operation to assume the shape of a rigidifying skirt, and having transition structure between said interior and peripheral portions of yield strength intermediate that of said interior portion and said peripheral portion, said transition structure at least partially circumscribing said interior portion and absorbing at least a part of the stretching forces and stretch deformation introduced in the mask-forming operation which would otherwise have acted upon and distorted said interior portion and thus said aperture pattern.

7. The mask defined by claim 6 wherein said sheet comprises a one-piece member having said transition structure formed integrally therein.

8. The mask defined by claim 7 wherein said sheet is thinned in said transition structure to cause said zone to have said intermediate yield strength.

9. The mask defined by claim 7 having material removed therefrom in predetermined areas in said transition structure to cause said transition structure to have said intermediate yield strength.

10. The mask defined by claim 9 wherein said predetermined areas represent an extension of the aperture pattern and constitute areas in which the sheet has been etched part-way through.

11. A method of forming an aperture mask for masking electrons flowing to the screen of a color cathode ray tube, comprising:

preparing a mask blank in the form of a sheet having an interior portion of relatively low yield strength containing a predetermined aperture pattern of electron-transmissive apertures and a peripheral portion surrounding said interior portion having a relatively high yield strength and being adapted to be deformed into a rigidifying skirt; and permanently deforming the blank out of the plane of said sheet in at least said peripheral portion to form a mask having a rigidifying skirt, said method being characterized by providing in said blank during said preparing step a transition structure between said interior and peripheral portions, of yield strength intermediate that of said interior portion and said peripheral portion, said transition structure at least partially circumscribing said interior portion to absorb at least a part of the stretching forces and stretch deformation introduced in the mask-forming operation which would otherwise act upon and distort said interior portion and thus said aperture pattern.

12. The method defined by claim 11 wherein said transition structure is provided by forming a transition structure stencil pattern on said blank during said preparing step and etching said blank through said transition zone stencil pattern to thin said blank in areas corresponding to said transition structure stencil pattern.

13. A method of forming an aperture mask for masking electrons flowing to the secreen of a color cathode ray tube, comprising:

preparing a mask blank from a thin sheet of an electrically conductive, permanently deformable, etchable material by forming on opposite sides of the blank is an interior portion thereof, registered, etch-resistant aperture stencil patterns corresponding in geometry to the aperture pattern desired for the mask, the electron stencil pattern on one side having a transition structure stencil pattern extending outwardly from the aperture stencil pattern into a transition portion disposed intermediate said interior portion and a peripheral portion of the blank;

etching the blank from both sides such that in said interior portion a pattern of through holes corresponding to the aperture stencil patterns are formed in the blank, whereas in said transition portion the blank is etched from one side only and only part-way through so as to form a transition structure in the blank having a yield strength which is intermediate that of the interior portion after etching and said peripheral portion of the blank; and permanently deforming the blank out of the plane of the sheet in said peripheral portion to form a mask having a rigidifying skirt, whereby said transition structure absorbs at least a part of the stretching forces and stretch deformation introduced in the mask-forming operation which would otherwise act upon and distort the interior portion of the mask and thus said aperture pattern.

14. The method defined by claim 13 wherein the mask is a shadow mask of the type used with dot triad type color cathode ray tube screen, and wherein said transition structure stencil pattern constitutes an extension for a number of rows of the aperture stencil pattern on the said one side of the blank.

* * * * *